(12) United States Patent
Ro et al.

(10) Patent No.: US 8,355,468 B2
(45) Date of Patent: Jan. 15, 2013

(54) CARRIER FREQUENCY ESTIMATION METHOD AND APPARATUS IN WIRELESS COMMUNICATION SYSTEM

(75) Inventors: Hee Jin Ro, Suwon-si (KR); Jong Han Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 586 days.

(21) Appl. No.: 12/626,736

(22) Filed: Nov. 27, 2009

(65) Prior Publication Data
US 2010/0128808 A1  May 27, 2010

(30) Foreign Application Priority Data
Nov. 27, 2008 (KR) .................. 10-2008-0119051

(51) Int. Cl.
*H04L 27/00* (2006.01)
(52) U.S. Cl. ........................................ 375/324
(58) Field of Classification Search .......... 375/260, 375/324–326, 340, 343
See application file for complete search history.

(56) References Cited

U.S. PATENT DOCUMENTS

| 7,388,921 | B2* | 6/2008 | Peter et al. ............. 375/260 |
| 8,098,713 | B2* | 1/2012 | Baxley et al. ........... 375/145 |
| 2008/0069252 | A1* | 3/2008 | Wenzhen et al. ........ 375/260 |
| 2008/0253279 | A1* | 10/2008 | Ma et al. ............... 370/206 |
| 2010/0135423 | A1* | 6/2010 | Lindoff et al. .......... 375/260 |

* cited by examiner

*Primary Examiner* — Khanh C Tran
(74) *Attorney, Agent, or Firm* — The Farrell Law Firm, P.C.

(57) ABSTRACT

A carrier frequency estimation method and apparatus is provided for improving frequency estimation performance in an Orthogonal Frequency Division Multiplexing (OFDM) communication system. The frequency estimation method for a wireless communication system includes summing correlations of four pairs of reference symbols transmitted at different frequency-time resource blocks in a pattern, each pair including two closest reference symbols; calculating a statistical value (E) by accumulating the summed correlation in a frequency direction; and estimating a frequency offset using an angle extracted from the statistical value (E).

8 Claims, 7 Drawing Sheets

CARRIER FREQUENCY ESTIMATION METHOD AND APPARATUS IN WIRELESS COMMUNICATION SYSTEM

PRIORITY

This application claims priority to an application entitled "CARRIER FREQUENCY ESTIMATION METHOD AND APPARATUS IN WIRELESS COMMUNICATION SYSTEM" filed in the Korean Intellectual Property Office on Nov. 27, 2008 and assigned Serial No. 10-2008-0119051, the contents of which are incorporated herein by reference.

BACKGROUND OF THE INVENTION

1. Field of the Invention

The present invention relates to wireless communication systems and, in particular, to a carrier frequency estimation method and apparatus in an Orthogonal Frequency Division Multiplexing (OFDM) communication system.

2. Description of the Related Art

Orthogonal Frequency Division Multiplexing (OFDM) is a multicarrier transmission technique whose history dates back to the mid-1960's and which has been in the limelight with the development of Very Large Scale Integration (VLSI). In an OFDM system, the system frequency band is divided into a number of subcarriers carrying data in parallel and it can be simply implemented with Fast Fourier Transform (FFT). Recently, OFDM has been adopted in various communication systems due to its superiority in spectral efficiency as compared to single carrier modulation schemes.

The OFDM scheme is robust to frequency selective fading channels as compared to the single carrier modulation scheme. This is because the frequency selective channel in the system frequency band composed of a plurality of subcarriers is reduced into a frequency nonselective channel in the subcarrier band that can be compensated through a simple equalization process. Particularly in OFDM, a cyclic prefix (which is a copy of the last part of the OFDM symbol) is inserted in front of each OFDM symbol so as to avoid Inter-Symbol Interference (ISI). With these beneficial characteristics, such as robustness to the frequency selective fading channel and ISI avoidance, OFDM has been chosen as the multiplexing method in broadband communication systems.

In the OFDM system, a carrier frequency synchronization algorithm is used to compensate the carrier frequency offset between the transmitter and receiver. The carrier frequency offset is present due to the difference between the reference frequencies of the local oscillators at the transmitter and receiver and the Doppler Effect of the channel. The carrier frequency offset of the input signal at the receiver can be greater than the interval between subcarriers. A process to compensate the integer part of the subcarrier frequency offset is defined as "coarse carrier frequency synchronization", while a process to compensate the fractional part of the subcarrier frequency offset is defined as "fine carrier frequency synchronization". Since the integer part of carrier frequency offset shifts the OFDM signal as much as the integer multiple in frequency domain, it has the effect of shifting the FFT output sequence.

In the meantime, the fractional part of the subcarrier frequency offset causes interference between the FFT outputs, resulting in a significant Bit Error Rate (BER). Typically, it is known that the OFDM system is more vulnerable to the carrier frequency offset as compared to the single carrier transmission system. In the present invention, a method for compensating a fine carrier frequency offset is provided.

The conventional carrier frequency offset estimation methods can be classified into two types: blind frequency offset estimation in time domain, and training symbol-based frequency offset estimation in frequency domain.

The blind frequency offset estimation method uses the Cyclic Prefix (CP) which is a copy of the last part of the OFDM symbol, which is inserted in front of the OFDM symbol. That is, the blind frequency offset estimation method uses the fact that the variation of the correlation between the CP and the last part of the OFDM symbol corresponds to the frequency offset. Although widely used, this method has drawbacks in that the frequency offset estimation performance is deteriorated as a number of signal paths increases, and especially when DC offset exists in the CP, the DC offset causes bias to the frequency offset estimation value.

The training symbol-based frequency offset estimation method uses the fact that the variation of two consecutive OFDM symbols corresponds to the frequency offset under the assumption that the two consecutive OFDM symbols are in an identical pattern.

The blind frequency offset estimation method is a time domain processing method, and the frequency offset estimation method using consecutive training symbols is a frequency domain processing method. Accordingly, in the frequency domain processing method, the estimation performance depends on the channel characteristics.

In the cellular environment, in which a mobile station receives signals from multiple base stations, the frequency offset values of the received signals from the respective base stations are likely to vary while the mobile station is on the move. Particularly when the mobile station is moving fast at the cell edge, the frequency offset variation occurs frequently, whereby the demodulation performance to the serving cell is deteriorated by the frequency offsets of the signals received from other neighbor base stations.

Among the conventional frequency synchronization methods for use in the OFDM receiver, a time domain estimation method using a CP in a single OFDM symbol estimates the frequency offset using all the signals received from serving and neighbor base stations of the cellular system. Accordingly, the signal received from the serving cell (i.e. serving base station) is influenced by the signals received from other neighbor base stations, thereby increasing the frequency offset and thus deteriorating the BER performance. In the meantime, the conventional frequency domain estimation method using two consecutive OFDM symbols estimates the frequency offset by calculating the correlation between the two consecutive OFDM symbols at the same subcarrier under the assumption that the two consecutive OFDM symbols are identical with each other. In the Long Term Evolution (LTE) system, however, the assumption of two consecutive OFDM symbols having an identical symbol pattern is not applied, and thus the conventional frequency domain frequency offset estimation method cannot be adopted.

SUMMARY OF THE INVENTION

In order to overcome the problems in the prior art, the present invention provides a carrier frequency estimation method and apparatus that is capable of improving carrier frequency offset estimation accuracy by using only the signal received from a serving base station in a cellular communication system including a plurality of base stations.

Also, the present invention provides a carrier frequency estimation method and apparatus that is capable of estimating carrier frequency offset caused by a radical Doppler shift by using reference symbols efficiently in the OFDM-based wireless communication system.

In accordance with an embodiment of the present invention, a frequency estimation method for a wireless communication system includes summing correlations of four pairs of reference symbols transmitted at different frequency-time resource blocks in a pattern, each pair including two closest reference symbols; calculating a statistical value (E) by accumulating the summed correlation in a frequency direction; and estimating a frequency offset using an angle extracted from the statistical value (E).

Preferably, summing the correlations includes calculating correlations of a first two pairs of consecutive reference symbols in the frequency domain, each pair having a shared reference symbol and a reference symbol preceding the shared symbol in the time domain; and calculating correlations of a second two pairs of consecutive reference symbols in the frequency domain, each pair having a shared reference symbol and a frequency reference symbol following the shared symbol in the time domain.

Preferably, summing the correlations includes calculating correlations of a first two pairs of consecutive reference symbols in the frequency domain, each pair having a shared reference symbol and a reference symbol following the shared symbol in the time domain; calculating correlations of a second two pairs of consecutive reference symbols in the frequency domain, each pair having a shared reference symbol and a frequency reference symbol following the shared symbol in the frequency domain; and summing the correlations of the first two pairs of reference symbols and the correlations of the second two pairs of reference symbols.

In accordance with another embodiment of the present invention, a frequency estimation apparatus for a wireless communication system includes a reference symbol extractor which extracts four pairs of reference symbols transmitted at different frequency-time resource blocks in a pattern, each pair including two closest reference symbols in a time domain; a correlator which calculates correlations of the four pairs of reference symbols and sums the correlations; a correlation accumulator which accumulates the summed correlations in a frequency direction to output a statistical value (E); and an angle detector which reads an angle from the statistical value (E) to output a frequency offset estimation value.

Preferably, the pattern is formed with a first two pairs of consecutive reference symbols in the frequency domain, each pair having a shared reference symbol and a reference symbol preceding the shared symbol in the time domain, and a second two pairs of consecutive reference symbols in the frequency domain, each pair having a shared reference symbol and a frequency reference symbol following the shared symbol in time domain.

Preferably, the pattern is formed with a first two pairs of reference symbols, each pair having a shared reference symbol and another reference symbol following the shared reference symbol in the time domain, and second two pairs of reference symbols, each pair having a shared reference symbol and another reference symbol following the shared reference symbol in time domain.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1A:
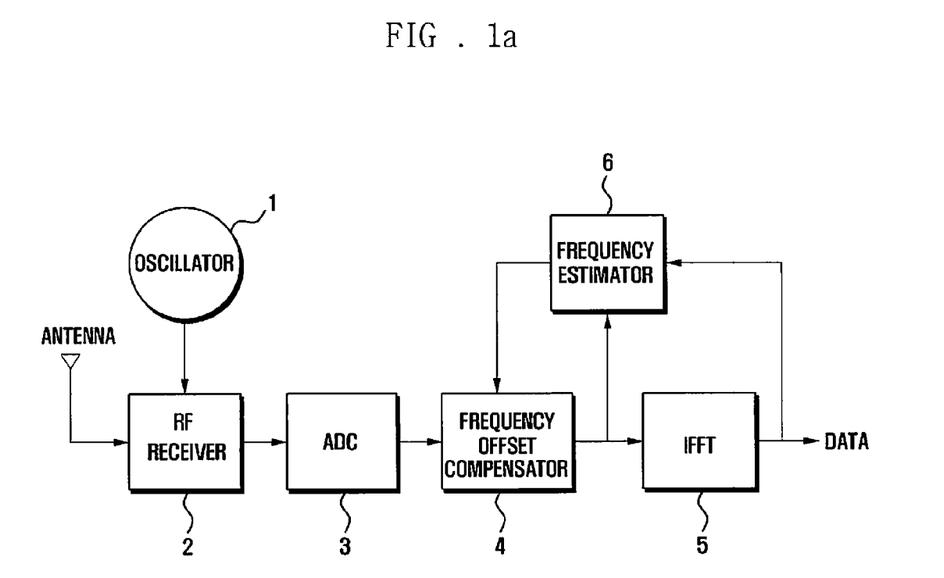
FIG. 1a is a diagram illustrating a configuration of a receiver according to an embodiment of the present invention.

FIG. 1a is a diagram illustrating a configuration of a receiver according to an embodiment of the present invention.

As shown in FIG. 1a, the receiver includes an oscillator 1 for generating an oscillation frequency, a Radio Frequency (RF) receiver 2 for receiving an RF signal by means of an antenna in tune with the oscillation frequency, an Analog to Digital Converter (ADC) 3 for converting the received RF signal into a digital signal, a frequency offset compensator 4 for compensating the frequency offset of the digital signal, an Inverse Fast Fourier Transformer (IFFT) 5 for performing inverse Fast Fourier transformation on the frequency offset-compensated signal, and a frequency estimator 6 for estimating a frequency offset using the output signals of the IFFT 5 and the frequency offset compensator 4. The output of the frequency estimator 6 is input to the frequency offset compensator 4 to compensate the frequency offset.

Figure 1B:
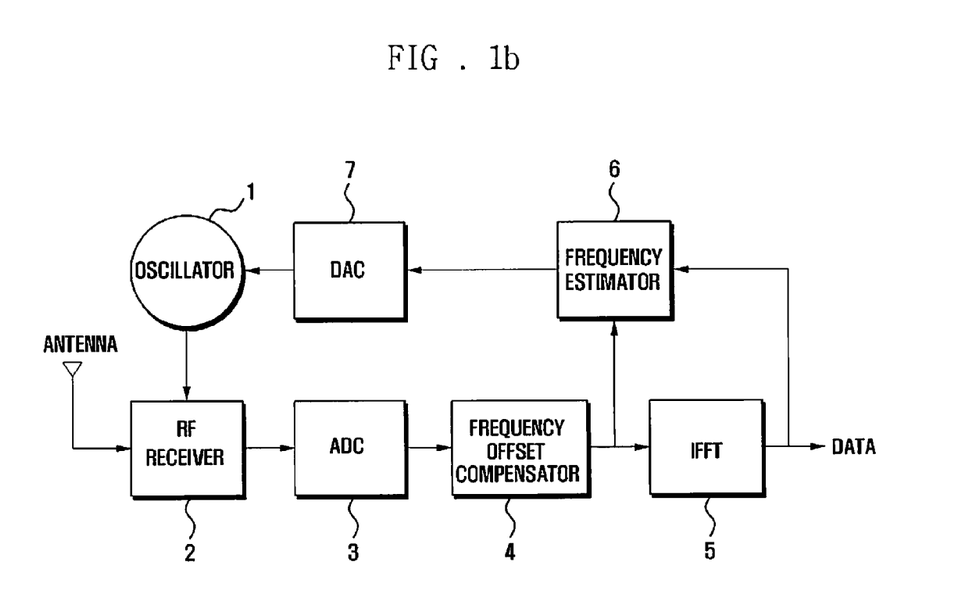
FIG. 1b is a diagram illustrating a configuration of a receiver according to another embodiment of the present invention.

FIG. 1b is a diagram illustrating a configuration of a receiver according to another embodiment of the present invention.

As shown in FIG. 1b, the receiver includes an oscillator 1 for generating an oscillation frequency, an RF receiver 2 for receiving an RF signal by means of an antenna in tune with the oscillation frequency, an Analog to Digital Converter (ADC) 3 for converting the received RF signal into a digital signal, a frequency offset compensator 4 for compensating the frequency offset of the digital signal, an Inverse Fast Fourier Transformer (IFFT) 5 for performing inverse Fast Fourier transformation on the frequency offset-compensated signal, a frequency estimator 6 for estimating a frequency offset using the output signals of the IFFT 5 and the frequency offset compensator 4, and a Digital to Analog Converter (DAC) 7 for converting the digital signal output by the frequency estimator 6 to a digital signal. The DAC 7 outputs the analog signal to the oscillator 1 to adjust the oscillation frequency output by the oscillator 1.

Figure 2:
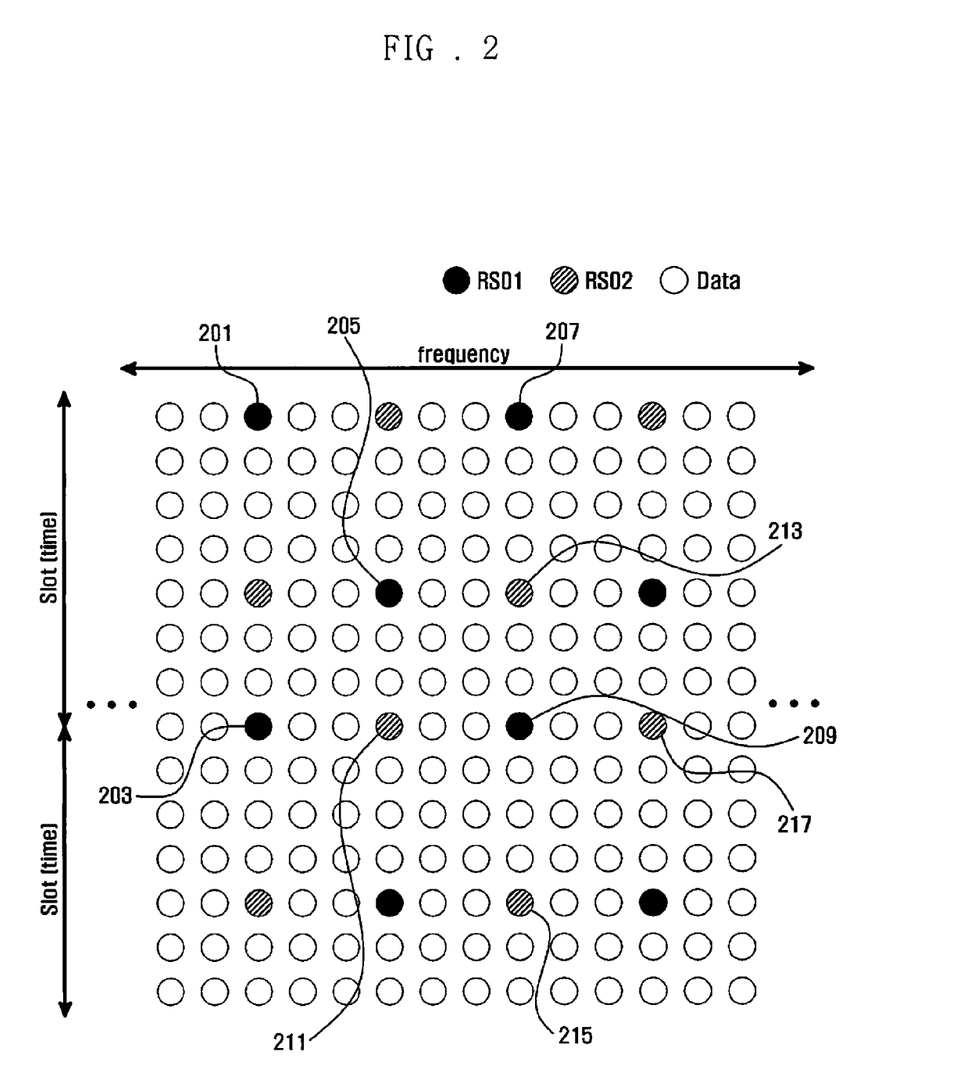
FIG. 2 is a diagram illustrating patterns of reference signals transmitted for frequency estimation in a wireless communication system according to an embodiment of the present invention.

FIG. 2 is a diagram illustrating patterns of reference signals transmitted for frequency estimation in a wireless communication system according to an embodiment of the present invention.

FIG. 2 shows a part of a downlink (DL) frame of a wireless communication system using Orthogonal Frequency Division Multiplexing (OFDM) as a radio access technology.

In FIG. 2, the vertical axis denotes the time axis, and the horizontal axis denotes the frequency axis. In time domain, a slot consists of 6 or 7 OFDM symbols.

In the case of using a normal CP, 7 OFDM symbols are transmitted in a slot, and the normal CP length is about 1/14 of the symbol length. In the case of using an extended CP, 6 OFDM symbols are transmitted in a slot, and the extended CP length is about 1/4 of the symbol length. In FIG. 2, the case of using the normal CP is depicted.

The OFDM symbols include reference symbols (RSs) carrying a sequence for identifying a base station (or cell) and data symbols carrying data.

The reference symbols include a known sequence (cell-specific random sequence) to identify the base station. In an embodiment of the present invention, the reference symbols are used for channel estimation. Since the frequency offset is estimated by using the reference symbols containing the cell specific sequence, it is possible to secure the stable frequency offset estimation only with the signal transmitted by the serving cell in a multi-base station cellular communication environment.

The mobile station served by a serving base station transmitting the first reference signal 'RS01' can receive the RS01 using the known sequence, and the mobile station served by a serving base station transmitting the second reference signal 'RS02' can receive the RS02 using the known sequence. In FIG. 2, the reference symbol pattern is of the case using the normal CP. In the case of using the normal CP, the reference symbols are transmitted every sixth subcarrier and every seventh OFDM symbol, staggering in both time and frequency domains.

In an embodiment of the present invention, the receiver performs frequency estimation using the reference symbols repeated on the frequency axis in a received frame. In order to estimate frequency, the following two reference symbol patterns can be used.

As shown in FIG. 2, a pattern 1 composed of the reference symbols 201, 203, 205, 207 and 209 and a pattern 3 composed of the reference symbols 211, 213, 215, and 217 have four pairs of reference symbols, each pair including two reference symbols different from each other in frequency and time but most close with each other.

That is, the pattern 1 includes two pairs of reference symbols consecutive in frequency domain, each pair having a shared reference symbol 205 and another reference symbol 201 or 207 preceding the shared symbol 205 in the time domain; and the other two pairs of reference symbols, each pair sharing the reference symbol 205 and another reference symbol 203 or 209 following the shared symbol 205 in the time domain.

Also, the pattern 2 includes two pairs of reference symbols, each pair having a shared reference symbol 213 and another reference symbol 211 or 217 following the shared reference symbol 213 in the time domain; and the other two pairs of reference symbols, each pair having a shared reference symbol 215 and another reference symbol 211 or 217 preceding the shared reference symbol 215 in the time domain.

The channel estimation method using the reference symbols according to the present invention is described hereinafter in more detail.

Figure 3:
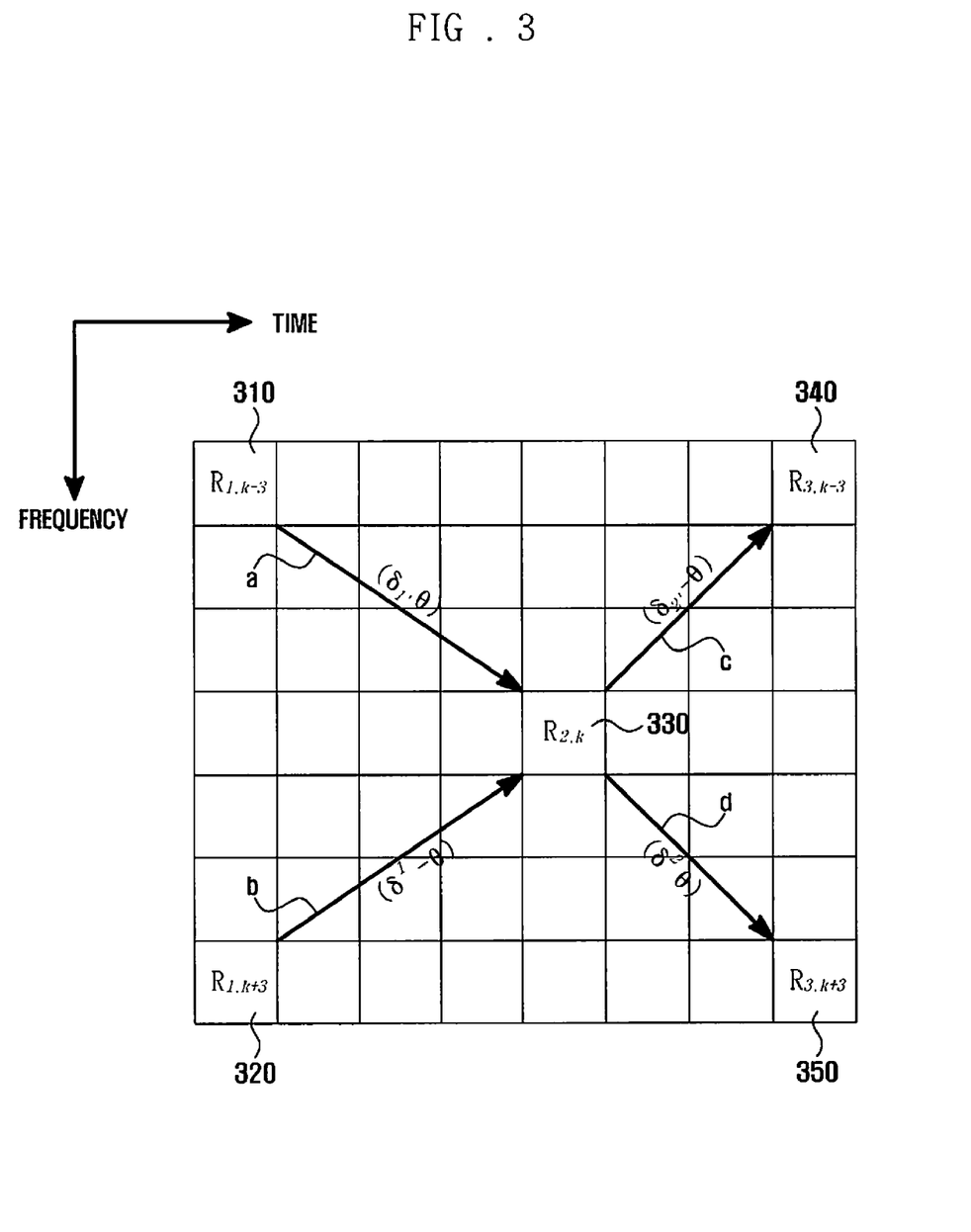
FIG. 3 is a diagram illustrating patterns of reference symbols for use in a channel estimation method according to an embodiment of the present invention.

FIG. 3 is a diagram illustrating patterns of reference symbols for use in a channel estimation method according to an embodiment of the present invention. In FIG. 3, the reference symbol patterns in a part of a downlink frame are depicted.

Reference numerals 310, 320, 330, 340, and 350 denote the first to fifth reference symbols.

These reference symbols can be expressed with their channel information as Equation (1).

The first reference symbol: $R_{1,k-3} = H_{1,k-3} \cdot \exp(-j\theta)$

The second reference symbol: $R_{1,k+3} = H_{1,k+3} \cdot \exp(j\theta)$

The third reference symbol: $R_{2,k} = H_{2,k} \cdot \exp(-j\delta_1)$

The fourth reference symbol: $R_{3,k-3} = H_{3,k-3} \cdot \exp(-j\theta) \cdot \exp(j\delta_1 + j\delta_2)$ The fifth reference symbol: $R_{3,k+3} = H_{3,k+3} \cdot \exp(j\theta) \cdot \exp(j\delta_1 + j\delta_2)$     (1)

where R denotes the reference symbol, and H denotes a Channel Frequency Response (CFR). $R_{n,k}$ denotes a reference symbol in an $n^{th}$ symbol at a $k^{th}$ subcarrier, and $H_{n,k}$ denotes a CFR in the $n^{th}$ symbol at the $k^{th}$ subcarrier. θ denotes a timing offset between reference symbols closest to each other in the frequency domain, $\delta_1$ denotes a frequency offset between the first reference symbol 310 or the second reference symbol 320 and the third frequency symbol 330, $\delta_2$ denotes a frequency offset between the second reference symbol 330 and the fourth reference symbol 340 or the fifth reference symbol 350.

The arrows a, b, c, and d represent the correlations of the reference symbol pairs, and the correlation of each pair of reference symbols can be expressed as Equation (2).

$$X \rightarrow Y : Y \times \text{conj}(X) \quad (2)$$

In the present invention, the correlations of two pairs of reference symbols (310 and 330, 320 and 330) each including a shared reference symbol 330 and a reference symbol 310 or 320 preceding the shared reference symbol 330 and the correlations of two pairs of reference symbols (330 and 340, 330 and 350) each including a shared reference symbol 330 and a reference symbol 340 or 350 following the shared reference symbol 330 are calculated as the arrows a, b, c, and d.

That is, the arrow 'a' denotes the correlation between the first reference symbol 310 and the third reference symbol 330, the arrow 'b' denotes the correlation between the second reference symbol 320 and the third reference symbol 330, the arrow 'c' denotes the correlation between the third reference symbol 330 and the fourth reference symbol 340, and the arrow 'd' denotes the correlation between the third reference symbol 330 and the fifth reference symbol 350. The correlations of the reference symbol pairs can be calculated using Equation (3) according to Equations (1) and (2).

$$a: R_{1,k-3} \rightarrow R_{2,k} : R_{2,k} \times R^*_{1,k-3} = H_{2,k} \cdot \exp(j\delta_1) H^*_{1,k-3} \cdot \exp(-j\theta) \quad (3)$$

$$b: R_{1,k-3} \rightarrow R_{2,k} : R_{2,k} \times R^*_{1,k-3} = H_{2,k} \cdot \exp(j\delta_1) H^*_{1,k-3} \cdot \exp(-j\theta)$$

$$c: R_{2,k} \rightarrow R_{3,k-3} : R_{3,k-3} \times R^*_{2,k} = H_{3,k-3} \cdot \exp(-j\theta) \cdot \exp(j\delta_1 + j\delta_2)$$

$$H^*_{2,k} \cdot \exp(j\delta_1)$$

$$= H_{3,k-3} H^*_{2,k} \exp(-j\theta) \exp(j\delta_2)$$

-continued $$d: R_{2,k} \to R_{3,k+3}: R_{3,k+3} \times R_{2,k}^* = H_{3,k+3} \cdot \exp(-j\theta) \cdot \exp(j\delta_1 + j\delta_2)$$
$$H_{2,k}^* \cdot \exp(j\delta_1)$$
$$= H_{3,k+3} H_{2,k}^* \exp(j\theta)\exp(j\delta_2)$$

The correlations (arrows a to d) between reference symbols are calculated on the frequency axis consecutively and accumulated k times. As a consequence, a sufficient statistical value (E) (herein after called "E") is calculated and expressed as Equation (4).

$$E = \sum_k \{a + b + c + d\}$$
$$= \sum_k R_{2,k} \times R_{1,k-3}^* + R_{2,k} \times R_{1,k-3}^* + R_{3,k-3} \times R_{2,k}^* + R_{3,k+3} \times R_{2,k}^*$$
$$= \sum_k \{H_{2,k} \cdot \exp(j\delta_1) H_{1,k-3}^* \cdot \exp(-j\theta) + H_{2,k} \cdot \exp(j\delta_1) H_{1,k-3}^* \cdot$$
$$\exp(-j\theta) + H_{3,k-3} H_{2,k}^* \exp(j\theta)\exp(j\delta_2) + H_{3,k+3} H_{2,k}^* \exp(j\theta)\exp(j\delta_2)\}$$

where E is a vector value, and the phase (angle) of the vector becomes a frequency offset estimation value ($\epsilon$). At this time, the estimation value can be compensated according to the CP length. The frequency offset estimation value ($\epsilon$) is compensated as Equation (5).

$$\varepsilon = \frac{1}{2\pi \cdot 7/2} \text{Angle}(E): \text{ normal } CP \text{ length} \quad (5)$$
$$\varepsilon = \frac{1}{2\pi \cdot 6/2} \text{Angle}(E): \text{ extended } CP \text{ length}$$

where "Angle(E)" is a function to read the phase (angle) of the vector. Particularly in the case of using the normal CP, the frequency offset estimation can be simplified as shown in Equation (3), and this shows the improvement of channel estimation performance as compared to the channel estimation method using interpolation of a symbol between the two reference symbols.

Figure 4:
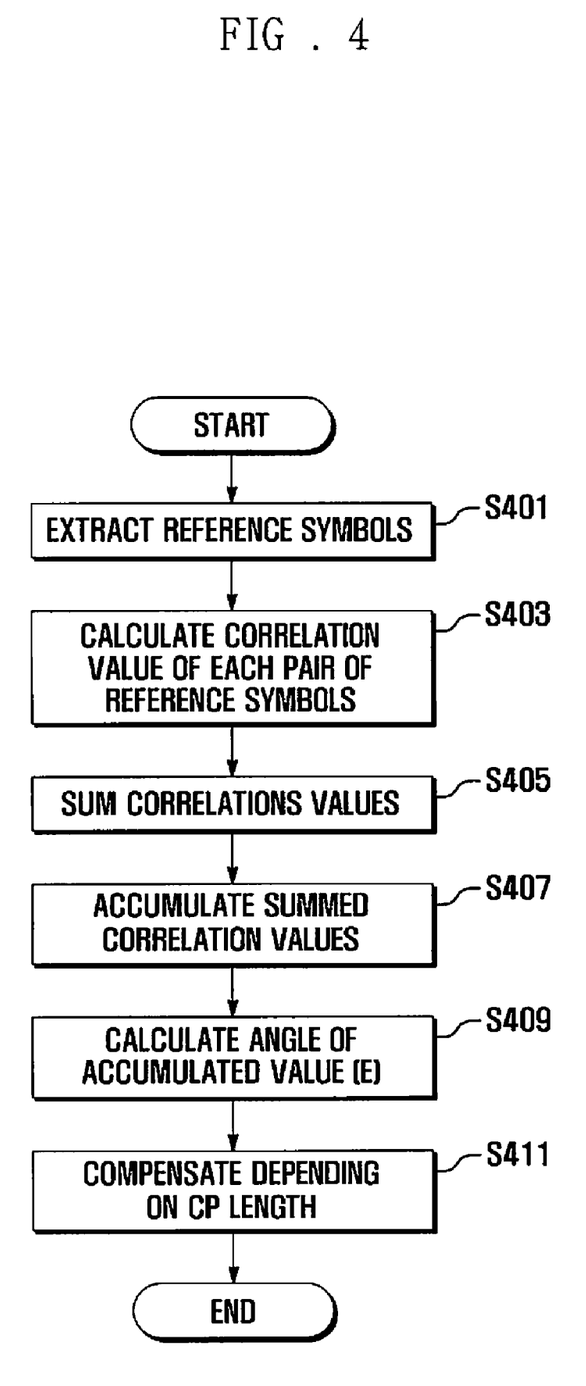
FIG. 4 is a flowchart illustrating a channel estimation method using reference symbols according to an embodiment of the present invention.

A channel estimation method using the reference symbols according to an embodiment of the present invention is described hereinafter in detail. FIG. 4 is a flowchart illustrating a channel estimation method using reference symbols according to an embodiment of the present invention.

Referring to FIGS. 3 and 4, a receiver extracts four pairs of reference symbols transmitted at different frequency-time resource elements, each pair being formed with two closest reference symbols in a received frame in step S401. Here, it is assumed that the reference symbols 310, 320, 330, 340, and 350 are transmitted in a specific pattern as shown in FIG. 3.

Next, the receiver calculates the correlation values between the reference symbols of each pair in step S403. That is, four correlation values of the four pairs of reference symbols are calculated. As aforementioned, the correlation between the reference symbols can be expressed as Equation (2), and the four correlations denoted by arrows a, b, c, and d are calculated using Equation (3).

Next, the receiver sums the four correlation values in step S405 and accumulates the summed correlation values to obtain the statistical value (E) in step S407. The statistical value can be obtained by accumulating the correlation values using Equation (4).

Next, the receiver calculates an angle of the statistical value (E) in step S409 and compensates the calculated angle according to the CP length, as shown in Equation (5), to obtain the frequency estimation value in step S411.

The structure and operations of a channel estimation apparatus of the receiver for estimating frequency offset using the reference symbols according to an embodiment of the present invention are described hereinafter in detail.

Figure 5:
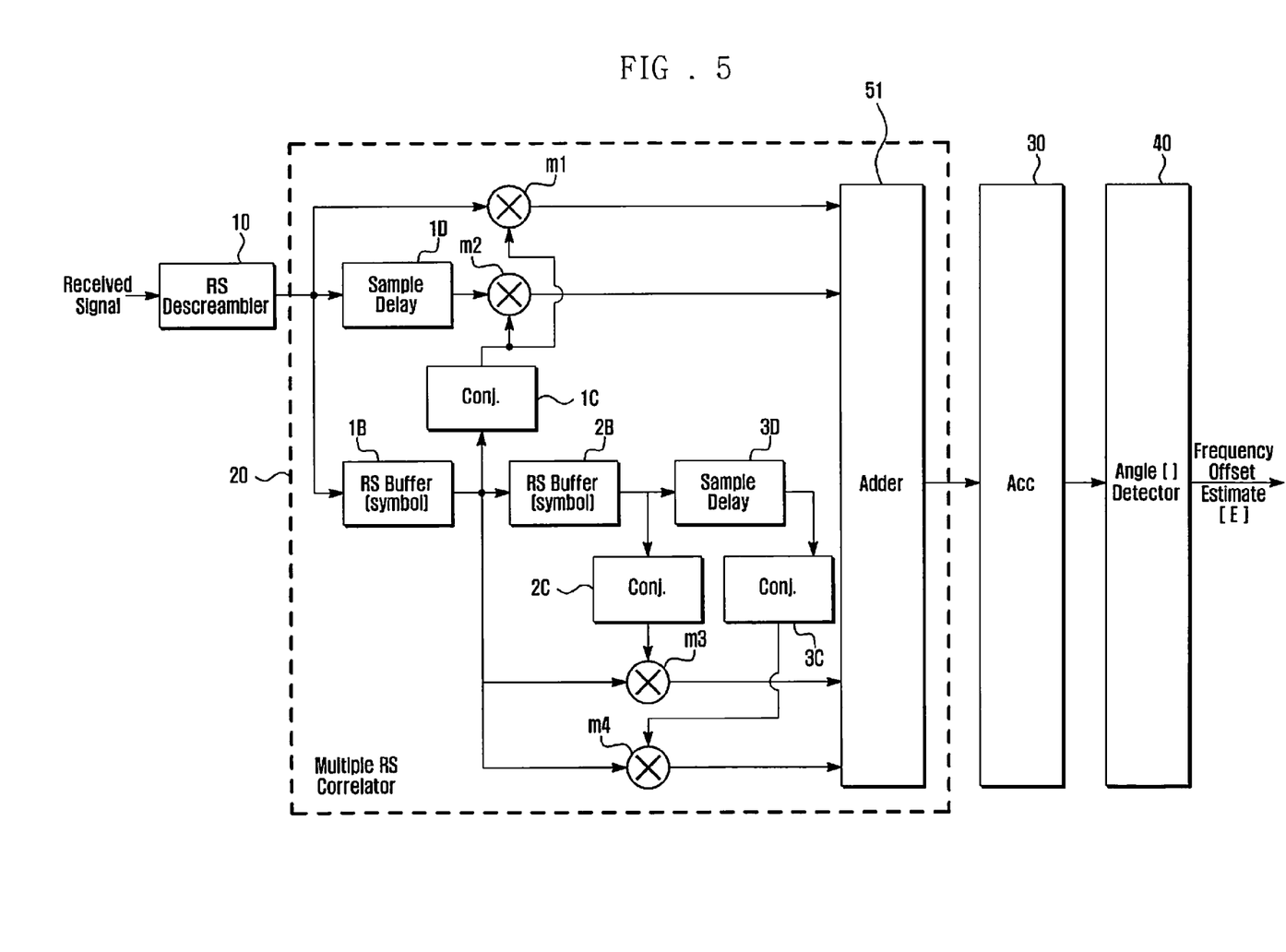
FIG. 5 is a block diagram illustrating a configuration of a frequency estimation apparatus according to an embodiment of the present invention.

FIG. 5 is a block diagram illustrating a configuration of a frequency estimation apparatus according to an embodiment of the present invention.

As shown in FIG. 5, the frequency estimation apparatus according to an embodiment of the present invention includes an RS descrambler 10, a correlator 20, a correlation value accumulator 30, and an angle detector 40.

The RS descrambler 10 descrambles a received signal to extract four pairs of reference symbols transmitted at different frequency-time resource elements in a specific pattern having four reference symbol pairs, each pair being formed with two closest reference symbols in a received frame. In the case of FIG. 3, the first to fifth symbols are extracted.

The correlator 20 correlates the reference symbols of each pair and sums the correlation values. That is, the correlator 20 calculates the correlation values of the four arrows (a to d) of FIG. 3 and sums the calculated correlation values using Equation (3).

The correlator 20 includes RS buffers, sample delays, conjugators, multipliers, and an adder 51.

In FIG. 5, the first and second sample delays 1D and 3D are included. The buffers include the first and second buffers 1B and 2B. The conjugators include first to third conjugators 1C, 2C, and 3C. The multipliers include the first to fourth multipliers m1, m2, m3, and m4.

The reference symbols input to the correlator 20 are delayed in time by the first and second sample delays 1D and 3D, buffered by the first and second buffers 1B and 2B, and then conjugated by the first to third conjugators 1C, 2C, and 3C. The conjugated signals are output to the corresponding multipliers m1 to m4 so as to be output as a result of vector multiplication. The computation process of the correlator 20 is described in association with the arrows a, b, c, and d of FIG. 3.

The third reference symbol 330 (see FIG. 3) is supplied to the second multiplier m2 via the first buffer 1B and the first conjugator 1C and vector-multiplied with the fifth reference symbol 350 output by the first sample delay 1D such that the multiplication result value is output to the adder 51. That is, the convolution of the third reference symbol 330 is multiplied with the fifth reference symbol 350, and the multiplication result value as the correlation value 'd' is input to the adder 51. The third reference symbol 330 is also supplied to the first multiplier m1 via the first buffer 1B and the first conjugator 1C and vector-multiplied with the fourth reference symbol 340 output by the RS descrambler 10 such that the multiplication result value is output to the adder 51. That is, the convolution of the third reference symbol 330 is multiplied with the fourth reference symbol 340, and the multiplication result value as the correlation value 'c' is input to the adder 51.

The first reference symbol 310 is supplied to the fourth multiplier m4 via the first RS buffer 1B, the second RS buffer 2B, the second sample delayer 3D, and the third conjugator 3C and vector-multiplied with the third reference symbol 330 output by the first RS buffer 1B such that the vector multiplication value is output to the adder 51. That is, the convolution of the first reference symbol 310 is multiplied with the third reference symbol 330, and the multiplication result value as the correlation value 'a' is input to the adder 51.

The second reference symbol 320 is supplied to the third multiplier m3 via the first RS buffer 1B, second RS buffer 2B and second conjugator 2C and vector-multiplied with the third reference symbol 330 output by the first RS buffer 1B such that the vector multiplication value is output to the adder 51. That is, the convolution of the second reference symbol 320 is multiplied with the third reference symbol 330, and the multiplication result value as the correlation value 'b' is input to the adder 51.

The multiplication result values output by the first to fourth multiplier m1 to m4 correspond to the arrows 'a' to 'd' in FIG. 3 and Equation (3).

The adder 51 outputs the sum of the correlation values to the accumulator 30, and the accumulator 30 accumulates the sum of the correlation values and outputs a statistical value E to estimate the frequency offset.

The angle detector 40 reads the angle of the statistical value E and compensates the estimation value depending on the CP length to output a compensated frequency offset estimation value.

Figure 6:
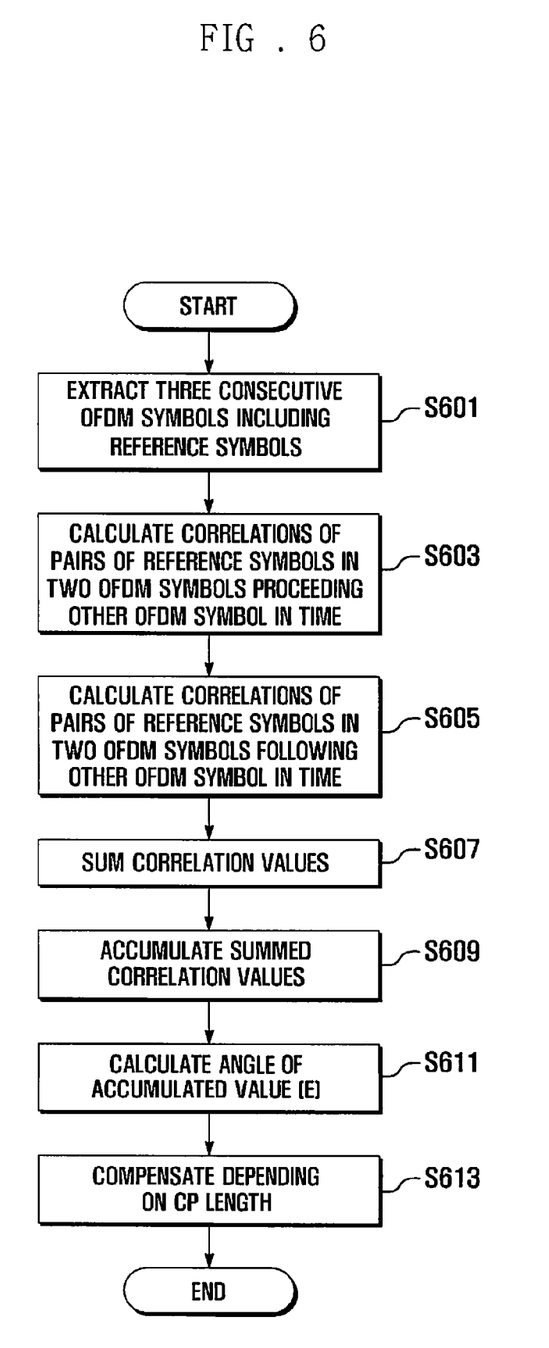
FIG. 6 is a flowchart illustrating a channel estimation method using reference symbols according to another embodiment of the present invention.

A channel estimation method using the reference symbols according to another embodiment of the present invention is described hereinafter in detail. FIG. 6 is a flowchart illustrating a channel estimation method using reference symbols according to another embodiment of the present invention. In the embodiment of FIG. 6, the receiver calculates the correlations between the first and second reference symbols and the third reference symbol, stores the calculated correlations, and then calculates the correlations between the third reference symbol and the fourth and fifth reference symbols. Referring to FIG. 6, the receiver extracts three consecutive OFDM symbols including reference symbols in step S601.

Next, the receiver calculates the correlations between the reference symbols of the two OFDM symbols proceeding the other OFDM symbol and stores the correlation values in step S603. That is, the receiver calculates the correlations 'a' and 'b' using Equation (3). Next, the receiver calculates the correlations between the reference symbols of the two OFDM symbols following the other OFDM symbol and stores the correlation value in step S605. That is, the receiver calculates the correlations 'c' and 'd' using Equation (3).

Next, the receiver sums the correlation values 'a' and 'b' calculated at step S603 and the correlation values 'c', and 'd' calculated at step S605 in step S607.

Next, the receiver accumulates the summed correlation values to obtain the statistical value E in step S609. That is, the receiver calculates the statistical value E by accumulating the summed correlation values using Equation 4.

Next, the receiver calculates the angle from the statistical value E in step S611 and compensates the read value depending on the CP length to finally obtain the frequency estimation value in step S613.

The structure and operations of a channel estimation apparatus of the receiver for estimating frequency offset using the reference symbols according to another embodiment of the present invention are described hereinafter in detail.

Figure 7:
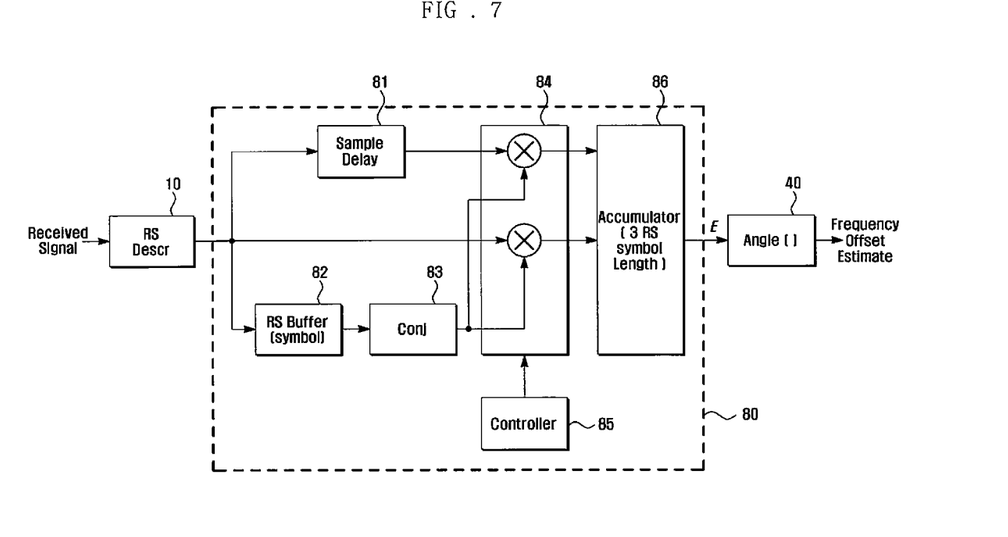
FIG. 7 is a block diagram illustrating a configuration of a frequency estimation apparatus according to another embodiment of the present invention.

FIG. 7 is a block diagram illustrating a configuration of a zo frequency estimation apparatus according to another embodiment of the present invention.

As shown in FIG. 7, the frequency estimation apparatus according to another embodiment of the present invention includes an RS descrambler 10, a correlation accumulator 80, and an angle detector 40.

The RS descrambler 10 descrambles the received signal to extract the reference symbols from three consecutive OFDM symbols including reference symbols. At this time, the RS descrambler 10 outputs the reference symbols to the correlation accumulator 80 as described with reference to FIG. 6.

The correlation accumulator 80 includes a sample delay 81 for delaying the reference symbols, an RS buffer 82 for buffering the reference symbols, a conjugator 83 for conjugating the reference symbol output by the RS buffer 82, a multiplication unit 84 having two multipliers, a controller 85, and an accumulator 86.

The correlation accumulator 80 calculates the correlations (c and d in FIG. 3) between the reference symbols included in the two OFDM symbols preceding the other OFDM symbol in the time domain among the three OFDM symbols and then calculates the correlations (a and b in FIG. 3) between the reference symbols included in the two OFDM symbols following the other OFDM symbol in the time domain among the three OFDM symbols. These two separate correlation stages are performed under the control of the controller 85.

The accumulator 86 of the correlation accumulator 80 sums the correlation values output by the multiplication unit 84 and accumulates the summed correlation values to output the statistical value E for estimating the frequency offset.

The angle detector 40 reads an angle from the statistical value E and compensates the statistical value E to output the frequency offset estimation value.

As described above, the frequency estimation method and apparatus of the present invention estimates the frequency offset using the cell-specific reference symbols containing a base station identity sequence, thereby improving frequency offset estimation performance in the multi-base station cellular communication environment.

Also, the frequency estimation method and apparatus of the present invention can use multiple reference symbols (RSs) so as to improve the reliability of the frequency offset estimation even in a high mobility environment and a frequency selective multipath fading channel environment.

Furthermore, the frequency estimation method and apparatus of the present invention is capable of obtaining sufficient frequency tracking performance even when an abrupt Doppler shift occurs by increasing the frequency offset estimation range.

Table 1 shows simulation environments for testing performance of the frequency estimation method according to an embodiment of the present invention, and Table 2 shows the simulation results of a conventional frequency estimation method and the reference symbol-based frequency estimation method according to an embodiment of the present invention, comparatively.

TABLE 1

Simulation Environment

| Simulation case | System Bandwidth (MHz) | Channel Model | Doppler Frequency (Hz) | CNR (Hz) | FFT timing offset |
|---|---|---|---|---|---|
| 1 | 20 | ETU6 | 300.00 | 0.00 | 0.00 |
| 2 | 20 | ETU6 | 900.00 | 0.00 | 0.00 |
| 3 | 20 | ETU6 | 300.00 | 0.00 | 150.00 |
| 4 | 20 | ETU6 | 900.00 | 0.00 | 150.00 |

TABLE 2

Simulation Environment
Automatic Frequency Controller (AFC) Tracking Algorithm

| Simulation case | RS (ALG2) (first method) | | | RS with Freq. Interpolation (ALG3) (second method) | | | Multi-RS Correlation Based Frequency Estimation (ALG4) (an embodiment of present invention) | | |
|---|---|---|---|---|---|---|---|---|---|
| | PD means (Hz) | PD means (Hz) | Frequency Tracking Range (Hz) | PD means (Hz) | PD means (Hz) | Frequency Tracking Range (Hz) | PD means (Hz) | PD means (Hz) | Frequency Tracking Range (Hz) |
| 1 | 0.4852 | 0.0694 | 1 KHz | 0.4780 | 0.0639 | 2 KHz | 0.4856 | 0.0643 | 2 KHz |
| 2 | −0.4752 | 0.2574 | | 0.4857 | 0.2236 | | 0.4694 | 0.2320 | |
| 3 | 0.4866 | 0.0724 | | −1.5395 | 0.2602 | | 0.4935 | 0.0927 | |
| 4 | −0.4860 | 0.2809 | | −1.2515 | 0.7557 | | 0.4795 | 0.2244 | |

Table 1 shows simulation environments, and Table 2 shows simulation results in the respective simulation environments. As shown in Table 2, the simulations have been conducted with a frequency estimation method using two reference symbols, a frequency estimation method interpolating a symbol between two reference symbols, and a frequency estimation method according to an embodiment of the present invention.

The performance simulations have been conducted in a simulation case 1 characterized by normal mobility and multipath fading channel, a simulation case 2 characterized by high mobility and low multipath fading channel, a simulation case 3 characterized by low mobility and high multipath fading channel, and a simulation case 4 characterized by high mobility and high multipath fading channel or timing offset.

The conventional frequency estimation method using two normal reference symbols shows high channel estimation error (case 2: −0.4752, case 4: −0.4680) and narrow frequency tracking range of ±1 KHz.

The interpolation channel estimation method shows high channel error in the environments having high multipath fading channels or timing offset (case 3: −1.5395, case 4: −1.2515, 0.7557).

The frequency estimation method according to an embodiment of the present invention shows superior frequency estimation performance in stability and with wide frequency tracking range, particularly in the simulation cases 2 and 3, as compared to the conventional frequency estimation methods.

In the simulation case 2 environment with high mobility, the frequency estimation method according to an embodiment of the present invention shows high frequency estimation performance without error and with frequency tracking range of 2 KHz which is twice greater than that of the conventional methods.

Also, in the simulation case 3 environment with high timing offset, the frequency estimation method according to an embodiment of the present invention shows low frequency estimation errors as compared to the conventional interpolation-based frequency estimation method.

From the simulation results, it is clear that the frequency estimation method according to an embodiment of the present invention can estimate the frequency offset stably even in the high mobility and high multipath fading channel environments and shows high reliability of frequency offset estimation in the high Doppler shift environment by expanding the frequency tracking range to 2 KHz.

As described above, since the frequency estimation method of the present invention uses the cell-specific reference symbols having a base identity sequence to estimate the frequency offset, it is possible to estimate the frequency offset stably with only the signals transmitted by the serving cell in the multi-base station cellular communication environment.

Also, the frequency estimation method of the present invention is capable of securing the high reliability of frequency offset estimation performance in high mobility and multipath fading channel environments by using a plurality of reference symbols.

Also, the frequency estimation method of the present invention is capable of securing sufficient frequency tracking performance even with the occurrence of an abrupt Doppler Shift by increasing the frequency tracking range.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A frequency estimation method for a wireless communication system, comprising:
    summing correlations of four pairs of reference symbols transmitted at different frequency-time resource blocks in a pattern, each pair including two closest reference symbols;
    calculating a statistical value (E) by accumulating the summed correlations in a frequency direction; and
    estimating a frequency offset using an angle extracted from the statistical value (E).

2. The frequency estimation method of claim 1, wherein summing the correlations comprises:
    calculating correlations of a first two pairs of consecutive reference symbols in a frequency domain, each pair having a shared reference symbol and a reference symbol preceding the shared symbol in a time domain; and
    calculating correlations of a second two pairs of consecutive reference symbols in the frequency domain, each pair having a shared reference symbol and a frequency reference symbol following the shared symbol in the time domain.

3. The frequency estimation method of claim 1, wherein summing the correlations comprises:
    calculating correlations of a first two pairs of consecutive reference symbols in a frequency domain, each pair having a first shared reference symbol and a reference symbol following the first shared symbol in a time domain;

calculating correlations of a second two pairs of consecutive reference symbols in the frequency domain, each pair having a second shared reference symbol and a reference symbol preceding the second shared symbol in the time domain; and summing the correlations of the first two pairs of reference symbols and the correlations of the second two pairs of reference symbols.

4. The frequency estimation method of claim 1, wherein estimating a frequency offset comprises:

reading an angle from the statistical value (E); and compensating the angle depending on a length of a cyclic prefix.

5. A frequency estimation apparatus for a wireless communication system, comprising:

a reference symbol extractor which extracts four pairs of reference symbols transmitted at different frequency-time resource blocks in a pattern, each pair including two closest reference symbols in a time domain;

a correlator which calculates correlations of the four pairs of reference symbols and sums the correlations;

a correlation accumulator which accumulates the summed correlations in a frequency direction to output a statistical value (E); and an angle detector which reads an angle from the statistical value (E) to output a frequency offset estimation value.

6. The frequency estimation apparatus of claim 5, wherein the pattern is formed with a first two pairs of consecutive reference symbols consecutive in a frequency domain, each pair having a shared reference symbol and a reference symbol preceding the shared symbol in the time domain, and second two pairs of consecutive reference symbols in the frequency domain, each pair having a shared reference symbol and a frequency reference symbol following the shared symbol in the time domain.

7. The frequency estimation apparatus of claim 5, wherein the pattern is formed with a first two pairs of reference symbols, each pair having a shared reference symbol and another reference symbol following the shared reference symbol in the time domain, and a second two pairs of reference symbols, each pair having a shared reference symbol and another reference symbol preceding the shared reference symbol in the time domain.

8. The frequency estimation apparatus of claim 5, wherein the angle detector compensates the frequency offset estimation value depending on a length of a cyclic prefix of a received frame.

* * * * *

UNITED STATES PATENT AND TRADEMARK OFFICE
CERTIFICATE OF CORRECTION

PATENT NO. : 8,355,468 B2  
APPLICATION NO. : 12/626736  
DATED : January 15, 2013  
INVENTOR(S) : Hee Jin Ro et al.

Page 1 of 1

It is certified that error appears in the above-identified patent and that said Letters Patent is hereby corrected as shown below:

Title Page (75) Inventors:

"Jong Han LEE" should be -- Jong-Han LIM --.

Signed and Sealed this  
Ninth Day of April, 2013

Teresa Stanek Rea  
*Acting Director of the United States Patent and Trademark Office*